United States Patent
Ryu et al.

(10) Patent No.: US 7,561,800 B2
(45) Date of Patent: Jul. 14, 2009

(54) OPTICAL BURST SWITCHING SYSTEM AND METHOD USING DUPLICATE BURST TRANSMISSION

(75) Inventors: Hyun-surk Ryu, Deajeon (KR); Tai-won Um, Yuseong-gu (KR); Jun-kyun Choi, Yongin-si (KR); Kyoo-ryon Hahm, Suwon-si (KR)

(73) Assignees: Samsung Electronics Co., Ltd., Suwon-si (KR); Research and Industrial Cooperation Group, Daejon (KR)

( * ) Notice: Subject to any disclaimer, the term of this patent is extended or adjusted under 35 U.S.C. 154(b) by 476 days.

(21) Appl. No.: 11/319,415

(22) Filed: Dec. 29, 2005

(65) Prior Publication Data

US 2006/0146871 A1    Jul. 6, 2006

(30) Foreign Application Priority Data

Dec. 30, 2004    (KR) ...................... 10-2004-0116297

(51) Int. Cl.
*H04J 14/00* (2006.01)
*H04J 3/00* (2006.01)

(52) U.S. Cl. .............................. 398/54; 398/45; 398/51; 370/464; 370/468

(58) Field of Classification Search .................... 398/45, 398/49–51, 53–58, 46, 47, 48, 69; 370/464, 370/466, 468, 474, 473, 498
See application file for complete search history.

(56) References Cited

U.S. PATENT DOCUMENTS

| | | | | |
|---|---|---|---|---|
| 6,628,610 | B1 * | 9/2003 | Waclawsky et al. | 370/229 |
| 6,959,151 | B1 * | 10/2005 | Cotter et al. | 398/54 |
| 7,130,313 | B2 * | 10/2006 | Pekonen | 370/473 |
| 7,376,138 | B1 * | 5/2008 | Cotter | 370/403 |
| 7,468,948 | B2 * | 12/2008 | Rogers | 370/241 |
| 2004/0042418 | A1 * | 3/2004 | Hamada et al. | 370/256 |
| 2004/0120261 | A1 * | 6/2004 | Ovadia et al. | 370/252 |

* cited by examiner

*Primary Examiner*—M. R. Sedighian
(74) *Attorney, Agent, or Firm*—Sughrue Mion, PLLC

(57) ABSTRACT

An optical burst switching (OBS) system and a method using duplicate optical burst transmission is provided. In accordance with the present invention, optical bursts do not have the same priority when the duplicate optical bursts are transmitted in an OBS network so that a burst loss rate due to blocking can be reduced. Optical bursts do not have the same priority when the duplicate optical bursts are transmitted in an OBS network, so that a burst loss rate due to the blocking can be reduced. After an optical burst control packet is transmitted on a signal channel using a unidirectional reservation manner in the OBS, a problem such as optical burst loss due to the blocking can be prevented even when the optical burst is transmitted on a data channel after an offset time is elapsed without any response messages.

21 Claims, 4 Drawing Sheets

OPTICAL BURST SWITCHING SYSTEM AND METHOD USING DUPLICATE BURST TRANSMISSION

CROSS-REFERENCE TO RELATED APPLICATIONS

This application claims priority from Korean Patent Application No. 2004-116297 filed on Dec. 30, 2004, the entire content of which is incorporated herein by reference.

BACKGROUND OF THE INVENTION

1. Field of the Invention

The present invention relates to an optical burst switching network and a method of reducing a burst loss rate due to blocking by means of duplicate optical burst transmission in the network.

2. Description of the Related Art

The optical burst switching (OBS) is an effective optical switching method capable of enhancing an optical channel usage rate by sharing optical wavelength resources between different ends from one another. In recent years, many protocols based on OBS have been proposed, and Just-Enough-Time (JET) OBS method may be employed as a representative example.

According to JET OBS, before collected packets, referred to as optical bursts are sent, a burst control packet (BCP) requesting a path reconfiguration of optical switches on the path is sent. Core nodes to be located in an intermediate of the path requires an electronic processing time for analysis on the BCP, so that a source node as an edge node positioned at an entrance of the optical network transmits the optical burst through an optical data channel with a time interval being equal to an offset time after transmission of the BCP. The transmitted optical burst is transparently delivered to a destination node as an edge node on the optical channel without having being subject to the electronic processing on the core node.

Hereinafter, an OBS network of the related art will be described with reference to FIG. 1.

FIG. 1 is a block view illustrating an OBS network according to the related art. A procedure of transmitting data bursts in the OBS network 100 will be described.

The node A 101 is an edge node and collects packets when Asynchronous Transfer Mode (ATM) packets or Internet Protocol (IP) packets are input to make a data burst. The data burst made by the node A 101 has a predetermined length. The edge nodes 101, 107, and 109 collect packets to make and transfer optical data burst packets or receive the optical data burst packet to separate them into each one.

The core nodes 103 and 105 act to optically switch the optical data burst. The node A 101, when the data burst is generated, generates a BCP and transmit it to a node B 103 as a core node, and transmits the data burst to the node B 103 after an offset time is elapsed. The BCP includes information about a destination address of the data burst, a generation address, a data burst size, a quality of service (QoS), an offset time and so forth.

The node B 103, by means of the received BCP, acknowledges the destination address of the data burst to be received later, determines an optical path, and schedules the time on the optical switching. The node B 103 can carry out optical switching onto the node D 107 or the node E 109 in response to the determination that the destination of the data burst transmitted from the node A 101 is the node D 107 or the node E 109.

In such an OBS manner, the optical burst having a long offset time has a relatively higher priority than an optical burst having a short offset time, so that a distinctive service can be provided making the offset times at the node A 101 as a source node different from one another to transmit the optical burst.

The OBS inevitably has an optical burst loss problem due to a contention for obtaining optical resources between control packets within a core node when the optical burst is transmitted on a data channel after an offset time is elapsed without any response messages after an optical BCP is transmitted on a signal channel using a unidirectional reservation manner.

In order to alleviate such optical burst loss problem, many methods have been proposed such as a method using a bidirectional signaling like Just-In-Time (JIT) OBS and wavelength routed OBS, a method using routing like depletion routing, a method using an optical burst scheduling within an OBS device like a latest available unused channel (LAUC), a method using optical burst segmentation, and so forth. These methods have a drawback that complicated signaling and processing is required.

In the meantime, a method has been proposed which sets an end-end session using a generalized multiprotocol label switching (GMPLS) signal protocol and applies JIT OBS to repeatedly transmit a copy of the optical burst on a backup path different from a transmission path of the original optical burst. According to this method, any one which is not subject to blocking between the original optical burst and the duplicate thereof received from two sessions having two different paths from each other is received at the destination node, thereby reducing a probability of optical burst loss. However, this method requires a traffic within the OBS network to increase two times, which causes a resultant blocking probability to increase so that a statistical multiplexing function of an optical layer as an advantage of the OBS cannot be utilized.

SUMMARY OF THE INVENTION

The present invention provides an OBS system and method using duplicate burst transmission which is capable of receiving the optical burst without any blocking by transmitting at least one duplicate optical burst having a lower priority than an original data burst to be transmitted.

According to one aspect of the present invention, there is provided an optical burst switching method at a destination node receiving a BCP including information about a data burst to be transmitted before receiving the data burst, and this method includes: receiving at least one between original and duplicate of each of the data burst and the BCP, both being transmitted with different priorities from one another; and processing the data burst of one received first between the original BCP and the duplicate BCP and discarding the data burst of the other received later.

A priority of the duplicate is set to be lower than a priority of the original, and the priority is higher when an offset time as a transmission time difference between the data burst and the BCP is longer.

The original and the duplicate may be transmitted on different paths from one another, or may be transmitted on the same path.

Discarding the data burst may include storing an identifier included in the BCP received first, and discarding the data burst corresponding to the BCP having the same identifier and received later, and the stored identifier is preferably deleted after a predetermined time is elapsed or when the BCP including the same identifier is received later.

According to another aspect of the present invention, there is provided an optical burst switching method at least one source node transmitting a BCP including information about a data burst to be transmitted to at least one destination node before transmitting the data burst, and this method includes: allowing the at least one source node to generate at least one data burst and an original of the BCP, both being transmitted with different priorities from one another; allowing the at least one source node to generate at least one duplicate of the original; and allowing the at least one source node to transmit the original and the duplicate to make the at least one destination node receive at least one between the original and the duplicate.

A priority of the duplicate is set to be equal to or higher than an original in one of the at least one source node having a priority lower by at least one level than a priority of the corresponding original, and the priority of the duplicate is lower than a priority having the lowest level among priorities of the at least one original, and is higher than a duplicate having a priority lower than the corresponding original of the at least one original.

According to another aspect of the present invention, there is provided an OBS system, which includes: at least one source node generating an original and a duplicate of each of a data burst and a BCP, and transmitting the BCP including information about the data burst to be transmitted prior to transmission of the data burst; at least one core node transmitting the original and the duplicate through a predetermined path; and at least one destination node receiving at least one between the original and the duplicate, processing the data burst of one received first between the original and the duplicate, and discarding the data burst of the other received later.

A priority of the duplicate is set to be equal to or higher than an original in one of the at least one source node having a priority lower by at least one level than a priority of the corresponding original, or a priority of the duplicate is preferably set to be lower than a priority having the lowest level among priorities of the at least one original, and higher than a duplicate having a priority lower than the corresponding original of the at least one original.

The priority may be higher when a transmission time difference between the data burst and the BCP is longer.

The original and the duplicate of each of the at least one source node may be transmitted through the at least one core node on different paths from one another, or may be transmitted through the at least one core node on the same path.

At least one destination node preferably stores an identifier included in the BCP received first, and discards the data burst corresponding to the BCP having the same identifier and received later, and the stored identifier is preferably deleted after a predetermined time is elapsed or when the BCP including the same identifier is received later.

BRIEF DESCRIPTION OF THE DRAWINGS

The above and/or other aspects and features of the present invention will be more apparent by describing certain exemplary embodiments of the present invention with reference to the accompanying drawings, in which.

DETAILED DESCRIPTION OF THE EXEMPLARY EMBODIMENTS

Figure 1:
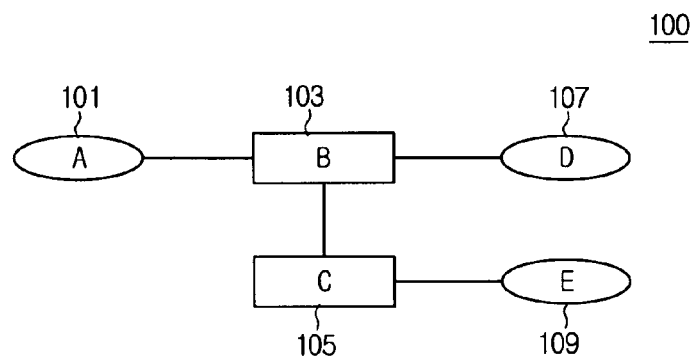
FIG. 1 is a block view illustrating an optical burst switching network according to the related art.

Exemplary embodiments of the present invention will be described in detail with reference to the annexed drawings. In the drawings, the same elements are denoted by the same reference numerals throughout the drawings. In the following description, detailed descriptions of known functions and configurations incorporated herein have been omitted for conciseness and clarity.

Figure 2:
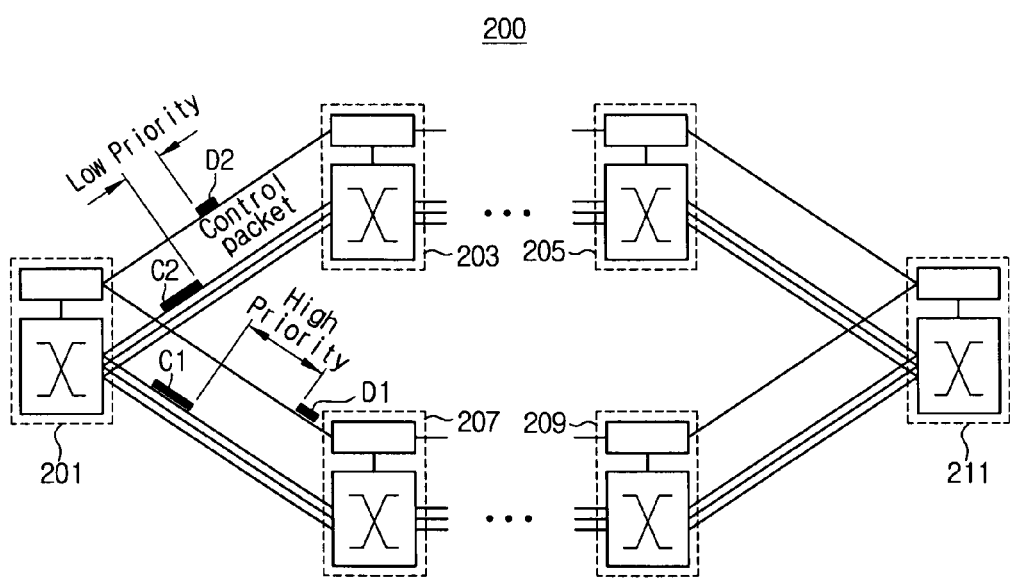
FIG. 2 is a view illustrating a network including an optical burst switching system using duplicate optical burst transmission in accordance with the present invention.

FIG. 2 is a view illustrating a network including an OBS system using duplicate optical burst transmission in accordance with the present invention.

The OBS system of the present invention prevents blocking at a receiving device by repeatedly transmitting at least one copy of a data burst having a lower priority other than an original to be transmitted.

Furthermore, the duplicate data bursts are made to have a lower priority, so that an offset time is set so as to prevent transmission of the original data burst from being blocked and use a redundant bandwidth not used by the original data burst.

Referring to FIG. 2, the system of the present invention includes at least one OBS device, a source node 201, first to fourth core nodes 203, 205, 207, and 209, and a destination node 211.

The source node 201, the first to fourth core nodes 203, 205, 207, and 209, and the destination node 211 are the same type of OBS devices and can operate with the same function as one another. However, it is assumed that data bursts are transmitted from the source node 201 to the destination node 211 through at least one node among the first to fourth core nodes 203, 205, 207, and 209 for a proper description of the present invention.

The source node 201 collects received data packets to generate a data burst while generating a BCP including information about the generated data burst, information about the destination node 211, path information toward the destination node 211, and a predetermined identifier. The identifier of the BCP is preferably, but not necessarily, a predetermined serial number. The source node 201 first transmits the BCP, and then transmits the data burst after a predetermined offset time is elapsed.

The offset time can be set calculating the number of hops required by the data burst to be transmitted from the source node 201 to the destination node 211 through at least one core node, and a processing time of the BCP at each core node.

The source node 201 can determine a priority of the data burst to be transmitted adjusting the offset time. That is, the longer the offset time, the higher the priority of the data burst. This is because a time required for the processing at the node which has received the BCP can be ensured by an increase in the offset time to thereby reduce the probability of corresponding data burst loss due to blocking.

The source node 201 can generate at least one copy of the data burst C2 which is duplicate from the original data burst C1. The source node 201 preferably, but not necessarily, sets the priority of the duplicate data burst C2 lower than the original data burst C1. However, the same control packet identifier is included in the original BCP D1 and the duplicate BCP D2.

The source node 201 may transmit the original data burst C1 and the duplicate data burst C2 to the destination node 211 through the same path, or may transmit them to the destination node 211 through different paths from one another.

However, the source node 201 may not transmit the duplicate data burst C2 when the number of data bursts to be transmitted increases to cause traffic amount to increase.

FIG. 2 illustrates the case that originals and duplicates thereof are transmitted through different paths from one another, and a description will be given hereinafter given that they are transmitted through different paths from one another. Accordingly, the original BCP D1 and the original data burst C1 are generated at the source node 201 and reach the destination node 211 through a path including the third core node 207 and the fourth core node 209. In addition, the duplicate BCP D2 and the duplicate data burst C2 are generated at the source node 201 and reach the destination node 211 through a path including the first core node 203 and the second core node 205.

The first to fourth core nodes 203, 205, 207, and 209 receive the original BCP D1 or the duplicate BCP D2 which is transmitted from a previous node on a path including the source node 201, and switch to the next node on the path so as to make the corresponding data burst transmitted toward the destination node 211.

The first to fourth core node 203, 205, 207, and 209 may take some time for processing the received BCP, which allows the original BCP D1 or the duplicate BCP D2 to be updated and transmitted to the next node on the path toward the destination node 211.

The destination node 211 receives the BCP and the data burst, and includes a control packet cache table having a control packet identifier and a timer.

The destination node 211 removes the control packet identifier entry indicating that a timer is terminated in the control packet cache table, and newly registers in the control packet cache table a control packet identifier which is not registered in the control packet cache table when its reads the control packet identifier from a newly received BCP. Table 1 below represents an example of the control packet cache table.

TABLE 1

| Control packet identifier | Timer |
| --- | --- |
| 12345 | 4 |
| 12346 | 6 |
| 12347 | 7 |
| 12348 | 8 |

The destination node 211 may receive both the original data burst and the duplicate data burst, or may receive only one among them.

Figure 3:
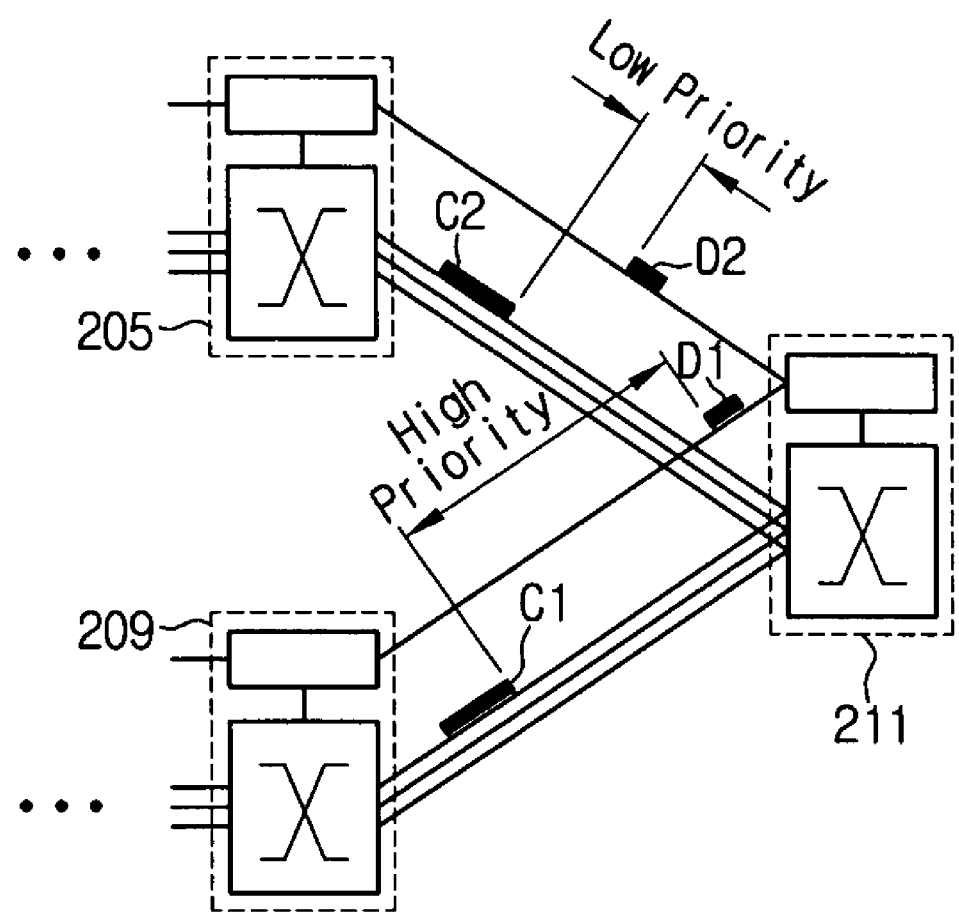
FIG. 3 is a view illustrating a situation that a data burst is arrived at a destination node in a case of FIG. 2.

FIG. 3 illustrates the case that the data burst reaches the destination node of FIG. 2, and the destination node 211 receives both of the original data burst C1 and the duplicate data burst C2. That is, there is no collision of data bursts through the first to fourth core nodes 203, 205, 207, and 209. However, when the collision occurs, if any, only that data bursts having no collision can be received.

The destination node 211, upon receipt of the BCP, compares the identifier recorded in the BCP with the entry of the control packet cache table. When the identifier of the received BCP is not present within the control packet cache table, it determines that the identifier is arrived for the first time, and processes the corresponding BCP and the data burst following the same. When the identifier of the received BCP is present within the control packet cache table, it determines that the original data burst or the duplicate data burst is already arrived, and discards the corresponding BCP and the data burst following the same without processing them.

Accordingly, the original BCP D1 is first arrived in FIG. 3, so that the original data burst C1 is received and processed, and the duplicate BCP D2 and the duplicate data burst C2 which arrive later are discarded even when they are received.

Hereinafter, a description will be given with reference to FIGS. 4A and 4B about the case that the original data burst and the duplicate data burst are transmitted on the same path.

Figure 4A:
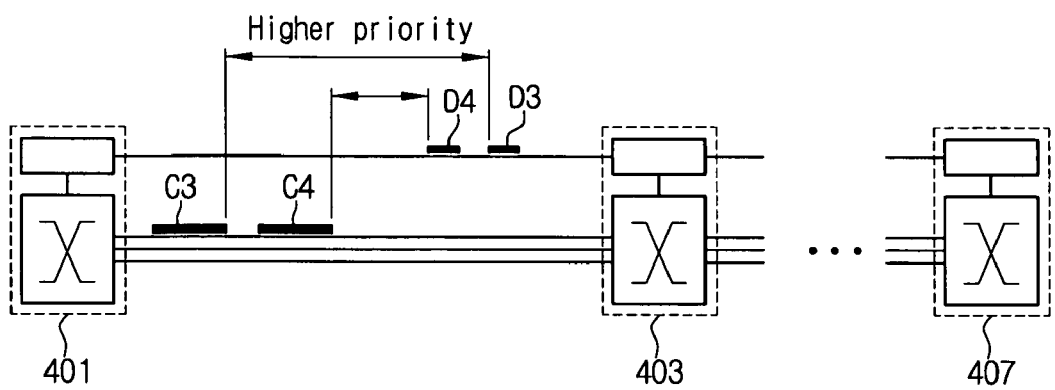
FIGS. 4A and 4B are views illustrating a network including an optical burst switching system using duplicate optical burst transmission in accordance with another exemplary embodiment of the present invention.
Figure 4B:
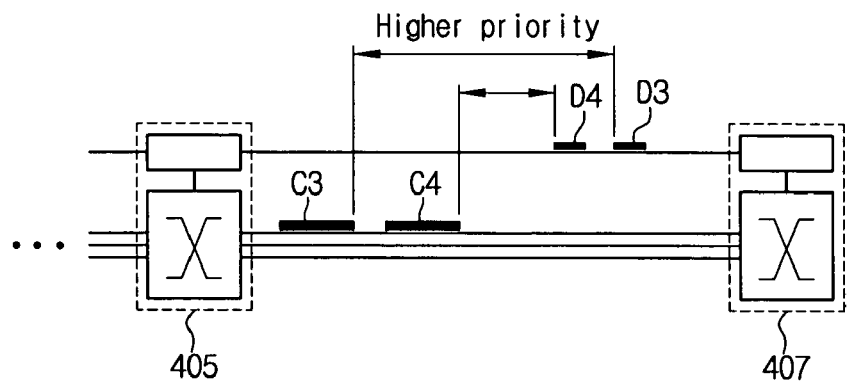

FIG. 4A and 4B are views illustrating a network including an OBS system using an optical burst duplicate transmission in accordance with another exemplary embodiment of the present invention.

FIGS. 4A and 4B illustrate that the original data burst C3 and the duplicate data burst C4 are transmitted to a destination node 407 on the same path.

Referring to FIGS. 4A and 4B, a source node 401, first and second core nodes 403 and 405, and a destination node 407 as OBS devices are included.

The source node 401 transmits the original data burst C3 having a high priority and the duplicate data burst C4 having a low priority with a time difference being applied therebetween, which corresponds to the source node 201 of FIG. 2.

The first core node 403 receives and processes all of the original data burst C3 and the duplicate data burst C4, and transmits them to the next core node (not shown) on the path until they arrive the destination node 407. Similarly, this corresponds to the first core node 203 of FIG. 2.

The destination node 407 corresponds to the destination node 211 of FIG. 2, and includes a control packet cache table as shown in Table 1 to process any one between the original and the duplicate.

Referring to FIG. 4B, the original BCP D3 first reaches the destination node 407 from the second core node 405, so that only the original data burst C3 is processed, and the duplicate BCP D3 and the duplicate data burst C4 are discarded without being processed.

Hereinafter, a total operation of the network including an OBS system using an optical burst duplicate transmission of the present invention will be described with reference to FIG. 5.

Figure 5:
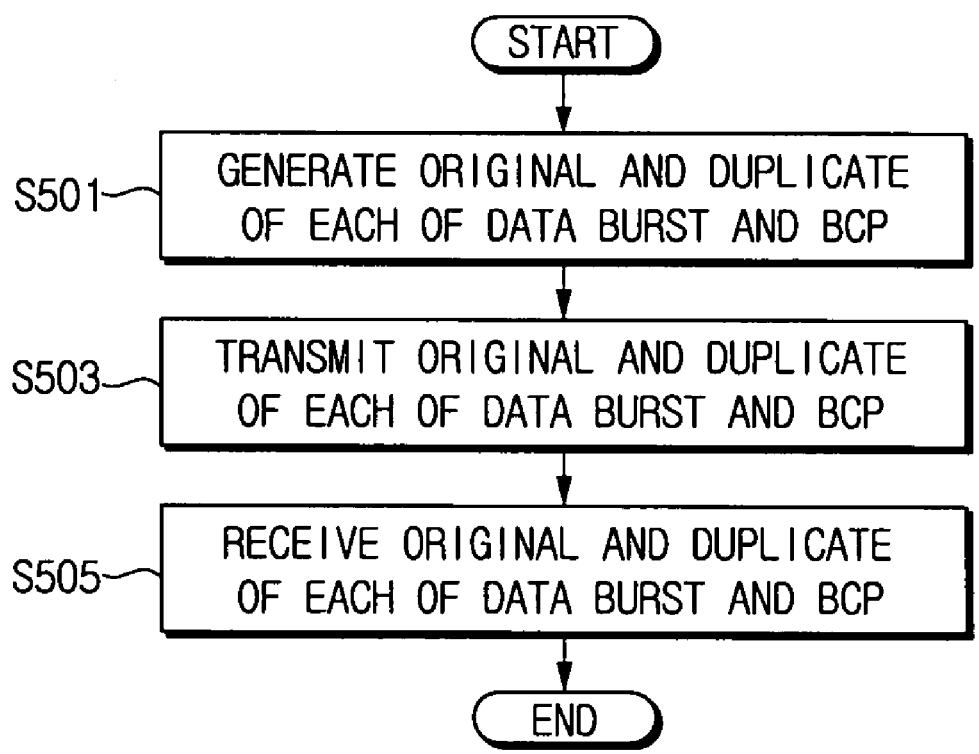
FIG. 5 is a flowchart illustrating for explaining operations of an optical burst switching system using duplicate optical burst transmission in accordance with an exemplary embodiment of the present invention.

FIG. 5 is a flow chart for explaining operations of the OBS system using an optical burst duplicate transmission, according to an exemplary embodiment of the present invention. Hereinafter, a description will be given basically with reference to FIGS. 2 and 5.

The source node 201, when the original data burst C1 and the original BCP D1 are generated, also generates the duplicate data burst C2 and the duplicate BCP D2. However, an offset time of the duplicate data burst C2 is set to be shorter than the original data burst C1, so that its priority is set to be lower than the original data burst C1 (S501).

The source node 201 transmits the duplicate data burst C2 and the original data burst C1 to the first core node 203 and the third core node 207 through different paths from each other, respectively. The first core node 203 and the third core node 207 transmit the original data burst C1 and the original BCP D1, and the duplicate data burst C2 and the duplicate BCP D2 to the next core nodes on the path toward the destination node 211, respectively. In addition, the first core node 203 and the third core node 207 may select the same path as shown in FIG. 4 to transmit the data bursts them with a time difference being applied therebetween (S503).

The destination node 211 may receive any one of the original and the duplicate data bursts, or may receive both of the original and duplicate data bursts in response to circumstances of the two different paths from each other.

By means of the control packet cache table, the one which arrives first is processed and the one received later is discarded even when both of the original and the duplicate are received as shown in FIG. 3. Accordingly, the original BCP D1 is first received and then compared with an entry of the control packet cache table as shown in FIG. 3. Upon their comparison, the control packet identifier of the original BCP D1 is not present in the entries, so that the original data burst C1 to be subsequently received is processed. When the duplicate BCP D2 is received, the original BCP D1 is already received and the identifier of the original BCP D1 is registered in one entry in the control packet cache table, so that the destination node 211 discards all of the duplicate BCP D2 and the duplicate data burst C2 to be subsequently received (S505).

By means of the method shown in FIG. 5, operations of the OBS system according to the present invention are carried out.

Hereinafter, a description associated with the priority of the duplicate data burst will be given in consideration of the case that a plurality of source nodes are included and a priority within the original data burst at each node is different from one another in accordance with another exemplary embodiment of the present invention.

By way of example, when source nodes S1 to S5 are present and respective priorities are 1, 2, 3, 4, and 5, an offset time of the original data burst generated in each of the source nodes S1 to S5 is longest at S1 and shortest at S5.

In this case, each priority of the duplicate data bursts generated in the respective source nodes S1 to S5 can be set to be equal to or higher than the original data burst having a priority lower than the priority of the original data burst of the corresponding source node by at least one. Table 2 represents an example which sets a priority of the duplicate data burst higher than the original data burst having a priority lower than a priority of the original data burst by one based on each source node.

TABLE 2

| Source node | Original priority | Duplicate priority |
|---|---|---|
| S1 | 1 | 1-1 |
| S2 | 2 | 2-1 |
| S3 | 3 | 3-1 |
| S4 | 4 | 4-1 |
| S5 | 5 | 5-1 |

Referring to Table 2, 1-1 means that the duplicate priority is lower than 1 but higher than 2.

Another method is to set priorities of the duplicate data bursts as 6, 7, 8, 9, and 10 following the priorities of the original data bursts 1, 2, 3, 4, and 5 of the source nodes S1 to S5. This is represented in Table 3 below.

TABLE 3

| Source node | Original priority | Duplicate priority |
|---|---|---|
| S1 | 1 | 6 |
| S2 | 2 | 7 |
| S3 | 3 | 8 |
| S4 | 4 | 9 |
| S5 | 5 | 10 |

By means of this method, operations of the OBS system of the present invention are carried out in a case of including at least one source node.

According to the present invention as described above, a data burst loss rate in the OBS device as a destination corresponds to a case that all of the original data bursts and the duplicate data bursts are lost in their intermediate path, so that an entire data burst loss rate can be significantly reduced.

In addition, according to the present method, duplicate data bursts are transmitted with a low priority, which does not interrupt transmission of the original data bursts having a high priority and a bandwidth unused by the original data bursts can be utilized, thereby capable of significantly reducing the data burst loss rate. This shows a remarkably improved effect as compared to the method of simply using duplicate transmission.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An optical burst switching method at a destination node receiving a burst control packet before receiving a data burst, the burst control packet including information about the data burst, the method comprising:

receiving an original data burst, an original burst control packet corresponding to the original data burst, a duplicate data burst which is a duplicate of the original data burst and a duplicate burst control packet corresponding to the duplicate data burst, the original data burst and the duplicate data burst being transmitted with different priorities; and processing one of the original data burst and the duplicate data burst based on which one of the original burst control packet and the duplicate burst control packet is received first, and discarding the other one of the original data burst and the duplicate data burst.

2. The method according to claim 1, wherein the priority of the duplicate data burst is set to be lower than the priority of the original data burst.

3. The method according to claim 2, wherein an offset transmission time difference between the original data burst and the original burst control packet is longer than an offset transmission time difference between the duplicate data burst and the duplicate burst control packet.

4. The method according to claim 1, wherein the original data burst and the duplicate data burst are transmitted on different paths.

5. The method according to claim 1, wherein the original data burst and the duplicate data burst are transmitted on the same path.

6. The method according to claim 1, wherein the discarding the other one of the original data burst and the duplicate data burst comprises:

storing an identifier included in the one of the original burst control packet and the duplicate burst control packet which is received first, and discarding the other one of the original data burst and the duplicate data burst corresponding to the other one of the original burst control packet and the duplicate burst control packet which includes the same identifier and is received later.

7. The method according to claim 6, wherein the stored identifier is deleted after a predetermined time is elapsed or when the other one of the original burst control packet and the duplicate burst control packet including the same identifier is received later.

8. An optical burst switching method, wherein at least one source node transmits a burst control packet before transmitting a data burst to at least one destination node, the burst control packet including information about the data burst, the method comprising:

generating at a first source node an original data burst and an original burst control packet corresponding to the original data burst;

generating at the first source node a duplicate data burst which is a duplicate of the original data burst; and transmitting the original data burst and the duplicate data burst from the first source node to the at least one destination node, which receives at least one of the original data burst and the duplicate data burst;

wherein the original data burst has a priority that is different from a priority of the duplicate data burst.

9. The method according to claim 8, wherein the priority of the duplicate data burst transmitted by the first source node is set to be equal to or higher than a priority of an original data burst generated by a second source node;

wherein the priority of the original data burst generated by the second source node is lower than the priority of the original data burst generated by the first source node.

10. The method according to claim 8, wherein the priority of the duplicate data burst transmitted by the first source node is lower than a lowest priority among priorities of original data bursts generated by all source nodes, and is higher than a duplicate data burst generated by a second source node which generates an original data burst having a priority which lower than the priority of the original data burst generated by the first source node.

11. The method according to claim 8, wherein an offset transmission time difference between the original data burst and the original burst control packet corresponds to a priority of the original data burst.

12. The method according to claim 8, wherein the original data burst and the duplicate data burst are transmitted through different paths.

13. The method according to claim 8, wherein the original data burst and the duplicate data burst are transmitted through the same path.

14. An optical burst switching system comprising:

a source node which generates an original data burst, an original burst control packet which includes information about the original data burst, a duplicate data burst which is a duplicate of the original data burst and a duplicate burst control packet which includes information about the duplicate data burst, and transmits the original burst control packet and the duplicate burst control packet before transmitting the original data burst and the duplicate data burst, respectively at least one core node which receives and transmits the original data burst, the original burst control packet, the duplicate data burst and the duplicate burst control packet through a predetermined path; and a destination node which receives, from the at least one core node, the original data burst, the original burst control packet, the duplicate data burst and the duplicate burst control packet, processes one of the original data burst and the duplicate data burst based on which one of the original burst control packet and the duplicate burst control packet is received first, and discards the other one of the original data burst and the duplicate data burst.

15. The optical burst switching system according to claim 14, wherein the priority of the duplicate data burst is set to be equal to or higher than a priority of an original data burst generated by another source node having a priority which is lower than a priority of the original data burst generated by the source node.

16. The optical burst switching system according to claim 14, wherein the priority of the duplicate data burst is lower than a lowest priority among priorities of original data bursts generated by other source nodes, and is higher than a duplicate data burst generated by one of the other source nodes which generates an original data burst having a priority which is lower than a priority of the original data burst generated by the source node.

17. The optical burst switching system according to claim 14, wherein an offset transmission time difference between the original data burst and the original burst control packet corresponds to a priority of the original data burst.

18. The optical burst switching system according to claim 14, wherein the original data burst and the duplicate data burst are transmitted through different core nodes on different paths.

19. The optical burst switching system according to claim 14, wherein the original data burst and the duplicate data burst are transmitted through the at least one core node on the same path.

20. The optical burst switching system according to claim 14, wherein the destination node stores an identifier included in the one of the original burst control packet and the duplicate burst control packet which is received first, and discards the other one of the original data burst and the duplicate data burst corresponding to the other one of the original burst control packet and the duplicate burst control packet which includes the same identifier and is received later.

21. The optical burst switching system according to claim 20, wherein the stored identifier is deleted after a predetermined time is elapsed or when the other one of the original burst control packet and the duplicate burst control packet including the same identifier is received later.

* * * * *